US009946895B1

(12) United States Patent
Kruse et al.

(10) Patent No.: US 9,946,895 B1
(45) Date of Patent: Apr. 17, 2018

(54) DATA OBFUSCATION

(71) Applicant: Amazon Technologies, Inc., Reno, NV (US)

(72) Inventors: William Frederick Hingle Kruse, Seattle, WA (US); Matthew John Campagna, Bainbridge Island, WA (US); Nima Sharifi Mehr, Vancouver (CA); Hardik Nagda, Seattle, WA (US); Radu Berciu, Seattle, WA (US); Gergory Branchek Roth, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 102 days.

(21) Appl. No.: 14/969,686

(22) Filed: Dec. 15, 2015

(51) Int. Cl.
*G06F 21/62* (2013.01)

(52) U.S. Cl.
CPC ...... *G06F 21/6245* (2013.01); *G06F 21/6227* (2013.01)

(58) Field of Classification Search
CPC ............ G06F 21/6227; G06F 21/6218; G06F 21/6245; G06F 21/10; G06F 21/62; H04L 63/10
See application file for complete search history.

(56) References Cited

U.S. PATENT DOCUMENTS

| | | | | |
|---|---|---|---|---|
| 9,652,597 B2* | 5/2017 | Roundy | ......... | G06F 21/10 |
| 2012/0137367 A1* | 5/2012 | Dupont | ......... | G06F 21/00 |
| | | | | 726/25 |
| 2013/0232543 A1* | 9/2013 | Cheng | ......... | G06F 21/6218 |
| | | | | 726/1 |
| 2013/0340082 A1* | 12/2013 | Shanley | ......... | G06F 21/577 |
| | | | | 726/25 |
| 2013/0340089 A1* | 12/2013 | Steinberg | ......... | H04L 63/10 |
| | | | | 726/27 |
| 2014/0026182 A1* | 1/2014 | Pearl | ......... | G06F 21/60 |
| | | | | 726/1 |
| 2014/0165137 A1* | 6/2014 | Balinsky | ......... | G06F 21/554 |
| | | | | 726/1 |

(Continued)

OTHER PUBLICATIONS

D.Harkins, "Synthetic Initialization Vector (SIV) Authenticated Encryption Using the Advanced Encryption Standard (AES)", Oct. 2008, RFC 5297, 26 pages.*

(Continued)

*Primary Examiner* — Yonas Bayou
(74) *Attorney, Agent, or Firm* — Hogan Lovells US LLP

(57) ABSTRACT

Sensitive data can be obfuscated before being provided for processing (i.e., aggregating, sorting, grouping, or transforming) using a pair of keys to generate a token that contains the sensitive data. The token can include a synthetic initialization vector, generated using a first key, and a ciphertext portion including the sensitive data encrypted under a second key. This tokenization can be performed by a data service or by an intermediate service that acts as an overlay or proxy for the underlying data service. The tokenized data can be provided for processing, and can remain tokenized until being received by an entity or system having access to at least the second key. A receiving entity with access to the second key can decrypt the ciphertext to obtain the plaintext, and if the first key is available the entity can perform a further integrity check on the tokenized data.

20 Claims, 7 Drawing Sheets

(56) References Cited

U.S. PATENT DOCUMENTS

| | | | |
|---|---|---|---|
| 2014/0230066 A1* | 8/2014 | Hurwitz | H04L 63/102 |
| | | | 726/26 |
| 2014/0258226 A1* | 9/2014 | Noteboom | G06F 17/30377 |
| | | | 707/615 |
| 2014/0380425 A1* | 12/2014 | Lockett | H04L 63/20 |
| | | | 726/4 |
| 2015/0006258 A1* | 1/2015 | Salama | G06Q 30/0206 |
| | | | 705/7.35 |
| 2015/0100527 A1* | 4/2015 | Ryan | H04L 51/12 |
| | | | 706/20 |
| 2015/0106946 A1* | 4/2015 | Soman | G06F 21/602 |
| | | | 726/26 |

OTHER PUBLICATIONS

Pornin, *Deterministic Usage of the Digital Signature Algorithm (DSA) and Elliptic Curve Digital Signature Algorithm (ECDSA)*; RFC 6979, Aug. 2013 (80 pages).

\* cited by examiner

DATA OBFUSCATION

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource or "cloud" provider. It will often be the case that a user will want one or more cloud resources to perform actions on behalf of the user. In order to enable these actions to be performed, the resources will often need access to customer data. Since some of that data may be sensitive or confidential, a user may not want to enable the resources to have access to that data. The data can be encrypted before being provided to those resources, but if multiple accesses are needed the encrypted data can be different each time such that at least certain tasks cannot be performed without having visibility into the underlying data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of resources and content in an electronic environment. In at least some embodiments, a customer or other entity can specify certain data as sensitive data, and can supply one or more access policies indicating who should have access to the plaintext version of that data. Sensitive data can be obfuscated before being provided for processing (i.e., aggregating, sorting, grouping, or transforming) by various components using a pair of keys to generate a token including the sensitive data. The token can include a synthetic initialization vector, generated using a first key, and a ciphertext portion including the sensitive data encrypted under a second key. This tokenization can be performed by a data service or by an intermediate service that acts as an overlay or proxy for the underlying data service. The tokenized data can be provided for processing, and can remain tokenized until being received by an entity or system having access to at least the second key. A receiving entity with access to the second key can decrypt the ciphertext to obtain the plaintext, and if the first key is available the entity can also perform a further security check on the tokenized data.

Various other such functions can be used as well within the scope of the various embodiments as would be apparent to one of ordinary skill in the art in light of the teachings and suggestions contained herein.

Figure 1:
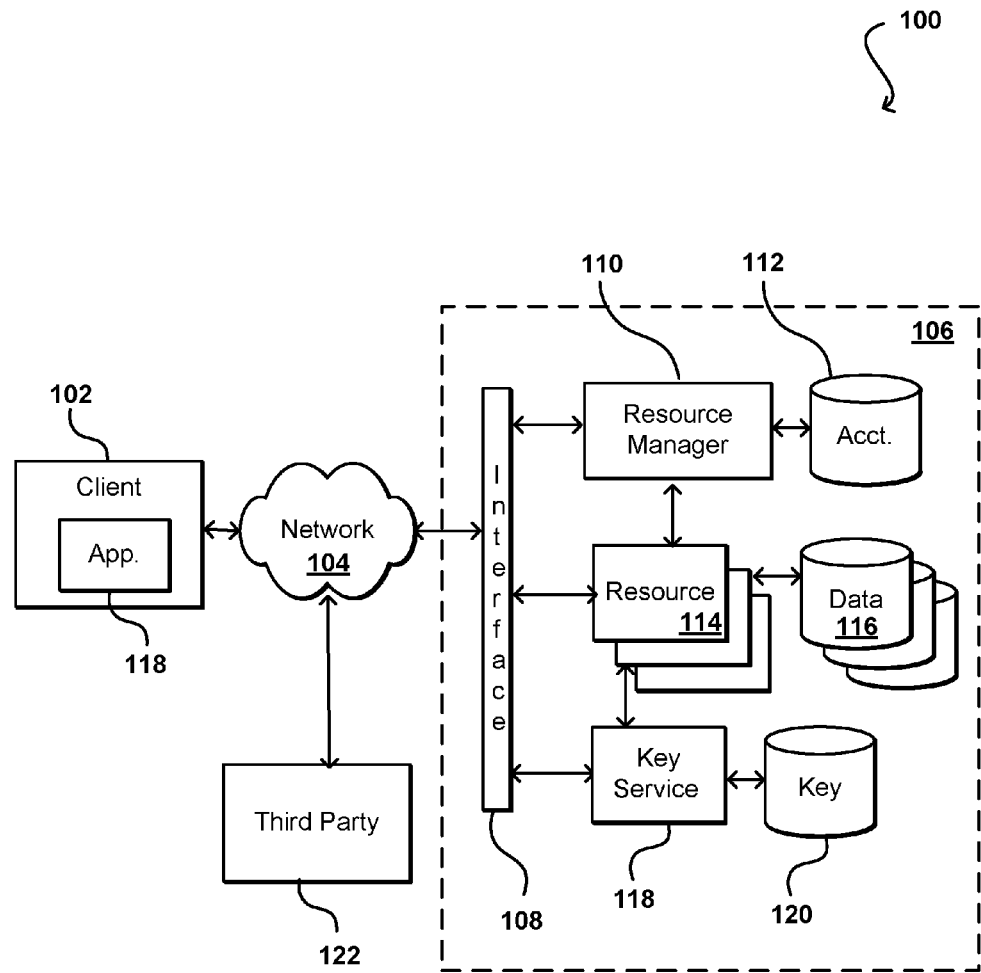
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment (i.e., a "multi-tenant environment") may include various types of electronic resources that can be utilized concurrently by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received at an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received at the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In at least some embodiments, a customer might want certain data to be secured, such that that data is unable to be accessed by at least unauthorized entities or components. In some embodiments a user can use an application 118 or console executing on a client device 102 to specify certain fields to secure, as well as rules or policies for managing the security. In some embodiments this can require the encryption of certain data using one or more keys, certificates, or other credentials. Accordingly, the resources 114 in the resource provider environment 106 can be configured to work with a key service 118, or other such system or component, in order to obtain, store, and/or manage various keys for use in encrypting the data. In some embodiments the key service 118 will maintain the keys in a protected data store 120, or other such location such as a trusted platform module (TPM), and can perform encryption and decryption operations on behalf of the resources, in order to prevent the keys or other credentials from being accessible elsewhere in the resource provider environment. In some embodiments the keys will be provided by the customer, while in other embodiments the keys can be received from an external provider or generated from within the key service 118, among other such options. The key service can be provided using any appropriate resources as discussed elsewhere herein for providing various services, as may include one or more servers, data storage devices, network interconnect, and the like.

As mentioned, such a multi-tenant environment can be used to manage large volumes of data of behalf of various customers. Since some of this data likely will be sensitive, or at least restricted from access by other unauthorized customers, it can be desirable for the environment to provide some type of security mechanism to prevent unauthorized access of this data, whether during storage, transmission, or processing. In some embodiments at least some level of encryption of the data can be used, whereby entities or components cannot access the unencrypted data without access to the appropriate keys or credentials. In situations where at least some level of processing of the data is desired, as may include basic sorting and grouping operations, for example, conventional encryption would prevent such processing as the same input data would be converted to different ciphertext each time it is encrypted. The generation of differing ciphertext is generally desirable for increased security using conventional approaches, but prevents some types of operations from being performed on the differing ciphertext. Further, not all data is sensitive such that encryption of all data may not be warranted and would otherwise introduce significant cost and overhead in the unnecessary encryption and decryption of data. For large amounts of data, the overhead for processing such data can also be excessive in at least some environments. Since only certain components in the resource provider environment 106 will be authorized to access the plain text, but various other components or resources may be instructed to perform operations with respect to the data, it can be desirable to protect the sensitive data as early in this pipeline as possible, and convert back to plaintext as late as possible in the pipeline, in order to maximize the number of systems and components that handle only the protected data.

Figure 2:
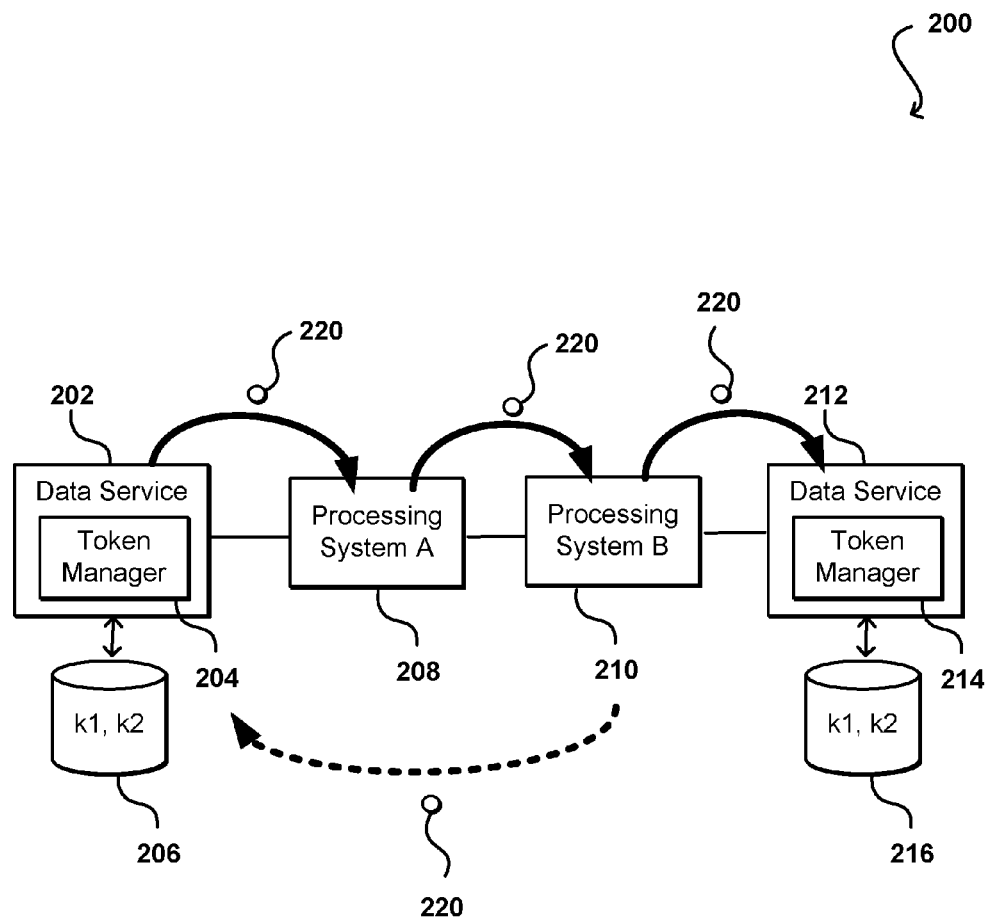
FIG. 2 illustrates an example environment in which a token manager can generate a token to obfuscate certain data fields that can be utilized in accordance with various embodiments.

Accordingly, FIG. 2 illustrates an example set of components 200 that can be utilized in a resource provider environment in accordance with various embodiments. In some embodiments at least some of these components can be located outside such an environment or security zone as discussed later herein. In this example, a resource such as a data service 202 (as may include one or more servers and other components) can manage data on behalf of one or more customers, where that data can be stored to an appropriate data store or other such location. At some point, one or more processing systems 208, 210 may request data for a specific customer in order to perform certain operations, as may include sorting, aggregating, transforming, grouping, and other such tasks. As mentioned, these tasks may be performed in a recurring manner, such that it is desirable for the same data to be provided each time. Thus, using conventional encryption for sensitive data would not be adequate in at least some situations.

Accordingly, approaches in accordance with various embodiments can utilize a token manager 204, or other such system, service, component, or application, to manage the protection of sensitive data in a multi-tenant (or other such) resource environment. The token manager can determine which data for an operation is sensitive, and can cause that information to be obfuscated or otherwise encrypted, tokenized, or protected such that an entity or system can perform the processing without accessing the unprotected data, particularly where the processing does not require the viewing or understanding of the data. For example, data can be transformed, grouped, sorted, or aggregated without the underlying plaintext being exposed. Further, approaches discussed herein enable the same plaintext to be obfuscated in the same way over time using a deterministic encryption algorithm, such that different occurrences of the obfuscated data could be correlated even though the underlying data is not determinable to at least some processing systems.

In this example a data service 202 can manage data stored in a local data store 206. The service 202 can include, or communicate with, a token manager 204 or other such system, service, application, or component that is configured to obfuscate sensitive data accessed by at least certain parties or entities. In this example, the data service might receive a request for data from a first processing system 208, such as processing system A. The data service can determine, using various rules and/or policies, that processing system A should not have access to at least some of the data for the request. Accordingly, the data service 202 can instruct the token manager 204 to obfuscate the relevant data such that the data can be provided in response to the request without violating access policies for the data.

In at least some embodiments, a token manager can utilize a pair of keys to obfuscate the data. Although the keys are symmetric in this example, asymmetric keys can be used as well as discussed elsewhere herein. The token manager can be configured to convert sensitive data into a deterministically encrypted token that can be processed by various components in (and potentially external to) the environment. As a first step of the tokenization process, the keys are determined, and a synthetic initialization vector is generated. The initialization vector can be a hash-based message authentication code (HMAC) computed using a secret key, here the first key k1. The initialization vector is called "synthetic" because it is not created randomly, but is instead derived from the data. The HMAC can be generated using an appropriate algorithm, such as MD5 of any of a family of secure hash algorithm (SHA) algorithms (i.e., SHA-256 or SHA-512), to process the sensitive data (often referred to as the "message" portion) using k1. The synthetic initialization vector in this example can constitute the first 16 bytes of the data token. The initialization vector here is called a synthetic initialization vector because it is not generated randomly but instead based upon the underlying sensitive data. The data can then be converted into ciphertext using an appropriate encryption approach, such as may be based upon the advanced encryption standard (AES) in some embodiments. In a specific example, the ciphertext is generated using the second key, k2, and synthetic initialization vector with a CBC block cipher mode and PLCS7 padding, in order to cause the plaintext "message" portion to have the determined block size for the selected block cipher. The ciphertext is then used with the synthetic initialization vector to form the encrypted token, wherein the sensitive data is obfuscated or redacted from the data for the request. This token can then be used instead of the sensitive data. As long as the same keys and data are used, the input will map (or transform) to the same output token, such that operations such as sorting and grouping can be performed on the tokens.

Accordingly, the data service 202 can provide the generated token 220 to the processing system 208 instead of the plaintext. As mentioned, some or all of the data can be tokenized in different cases depending upon the applicable rules, policies, or other such information. The processing system 208 may not have access rights to the plaintext and/or a copy of the keys for the token 220, and thus can perform certain operations only on the token(s) and not the underlying sensitive data. Any data exposed by the processing system 208 would then not include the sensitive underlying plaintext. The processing system 208 can pass the token along to another processing system 210 in a processing pipeline, or write the token to storage from which the second processing system 210 can access the token, among other such options.

The data can remain in token form at least until such time as the token 220 is received back to another data service 212, authorized client, or other such entity, system, or component that has access to at least the second key (k2) for the token. In some embodiments, the token could also be received back to the original data service 202 that stores the second key. In this example, the token is received to a data service 212 with a token manager 214 that has access to both of the keys (k1, k2) used to generate the token 220. In order to extract the plaintext for storage or other use by the data service, the data service use the second key to decrypt the ciphertext portion after the synthetic initialization vector, which forms the first sixteen bytes in this example. Since this is a symmetric cipher, any system that has access to the second encryption key, k2, will be able to decrypt the token. The plaintext once extracted can then be used as appropriate within the data service 212. Since this data service 212 also has a copy of the first key, k1, the data service 212 can perform an additional security check on the token by verifying that the k1 used to generate the token and synthetic initialization vector is as expected. Such a process can be used to provide a data pipeline that reads data from upstream systems, which may be controlled by another party, and immediately redact, obfuscate, or tokenize sensitive data before sending it to a processing system and/or writing the data to disk or long-term storage. Subsequent processing steps in the pipeline can be separate clusters without the symmetric key, and therefore unable to decrypt the sensitive data.

Figure 3:
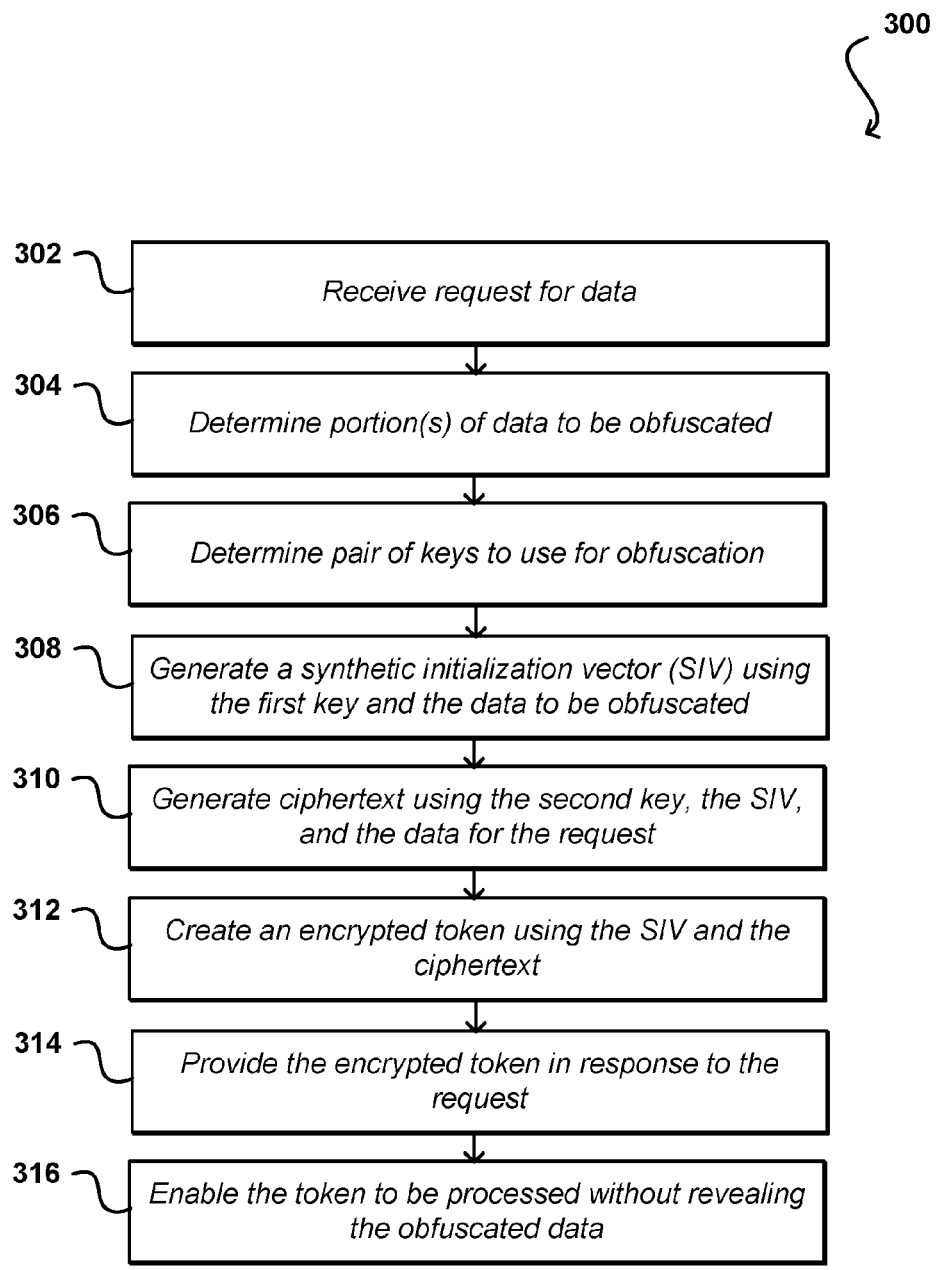
FIG. 3 illustrates an example process for generating a token that obfuscates specific data fields that can be utilized in accordance with various embodiments.

FIG. 3 illustrates an example process 300 for obfuscating sensitive data that can be utilized in accordance with various embodiments. It should be understood that there can be additional, fewer, or alternative steps performed in similar or alternative orders, or in parallel, within the scope of the various embodiments unless otherwise specifically stated. In this example, a request for data is received 302, such as from a processing system to a data storage service. The data for the request can be analyzed to determine 304 one or more portions, subsets, or fields of data that are sensitive and thus should be obfuscated before being provided in response to the request. The data to be obfuscated can be determined using any appropriate policy, rule, role, or other such access or security criteria. In order to perform the obfuscation of the sensitive data, a pair of keys can be determined 306. As mentioned, these can be symmetric keys that are mapped to this data such that any obfuscation of this data will utilize the same keys. Instead of taking two keys as input, in some embodiment a single longer key (i.e., a 512 bit key) can be split in half, a key derivation scheme (as may utilize a key derivation algorithm or function (KDF)) can be used to turn one key into two keys, among other such options.

A synthetic initialization vector can be generated 308 using the keys and the sensitive data. This initialization vector can be used with the second key to generate 310 ciphertext based on the sensitive data. The initialization vector and ciphertext then can be combined to create 312 a data token that can be provided 314 instead of the sensitive plaintext data. In some embodiments the token can also include an indication of the key used to support key rotation. A processing system or other recipient of the token can then be enabled 316 to process (i.e., aggregate, sort, or transform) the token in lieu of the sensitive plaintext data. As mentioned, in at least some embodiments the data for the request that was not determined to be sensitive could have been provided as plaintext, among other such options.

Figure 4:
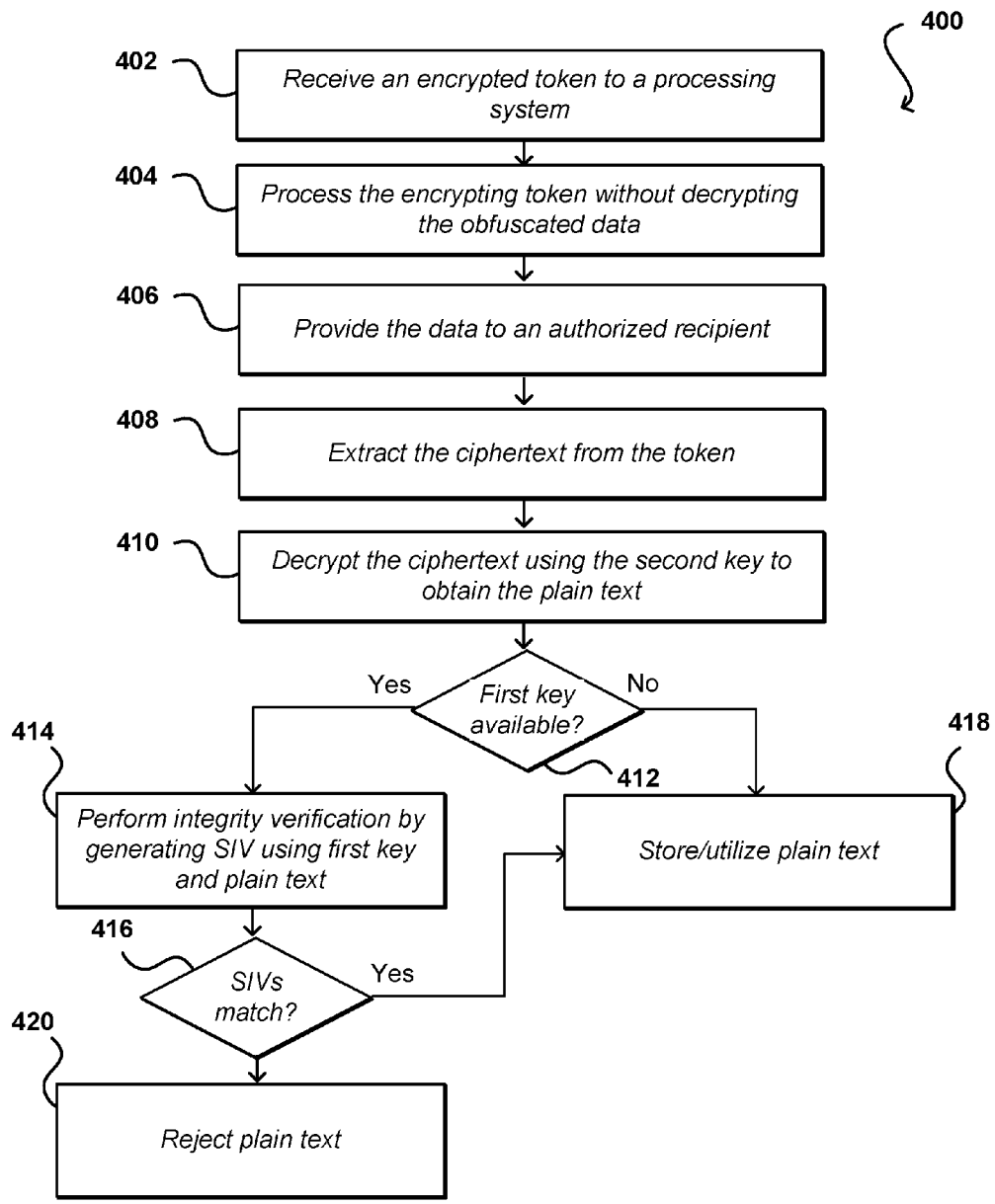
FIG. 4 illustrates an example process for utilizing a data token and extracting plain text for obfuscated fields that can be utilized in accordance with various embodiments.

FIG. 4 illustrates an example process 400 for processing such a token that can be utilized in accordance with various embodiments. In this example, the encrypted token is received 402 to a processing system, which in some embodiments could be one of a series of processing systems along a data pipeline. Each such processing system, lacking a copy of the second key k2, can process 404 the encrypted token without decrypting the obfuscated data. As mentioned, in some embodiments only the sensitive data will be tokenized, with the remaining data in plaintext or another such format. Further, the processing can include any appropriate processing that does not require access to the underlying plaintext, as may include aggregation, sorting, grouping, or transforming, among other such options. After the processing, the data can be stored to persistent storage or provided 406 to an authorized recipient, among other such options. The recipient can extract 408 the ciphertext from the token and, having a copy of the second key k2, can decrypt 410 the ciphertext in order to access the underlying plaintext. If the recipient also has the first key available 412, the recipient can perform 414 an integrity verification using the first key. This can include, in at least some examples, generating a new synthetic initialization vector (SIV) using the first key and the decrypted sensitive data. A comparison can then be made to determine 416 whether the generated SIV matches the SIV extracted from the token. If the SIVs match, or if the first key was not available to perform the additional integrity check, the plaintext can be stored or utilized 418 as appropriate. If the integrity test is performed and the SIVs do not match, the plain text can be rejected or otherwise handled appropriately.

In some embodiments, a one-way hash function or HMAC can be used to convert messages into tokens. The corresponding mapping can then be stored such that the message can be determined given a token. These mappings could be stored in write-only storage so that an attacker who gains access to the system cannot read previous values. Another example embodiment can utilize asymmetric encryption. An advantage to such a system is that the private key never needs to reside with the redacting entity, thus reducing the opportunity for misuse. A potential disadvantage is that the encrypted tokens could be very lengthy. Various other MAC, hash, and encryption functions can be utilized as well, in place of the HMAC, SHA256, and AES selections discussed above, within the scope of the various embodiments.

Figure 5:
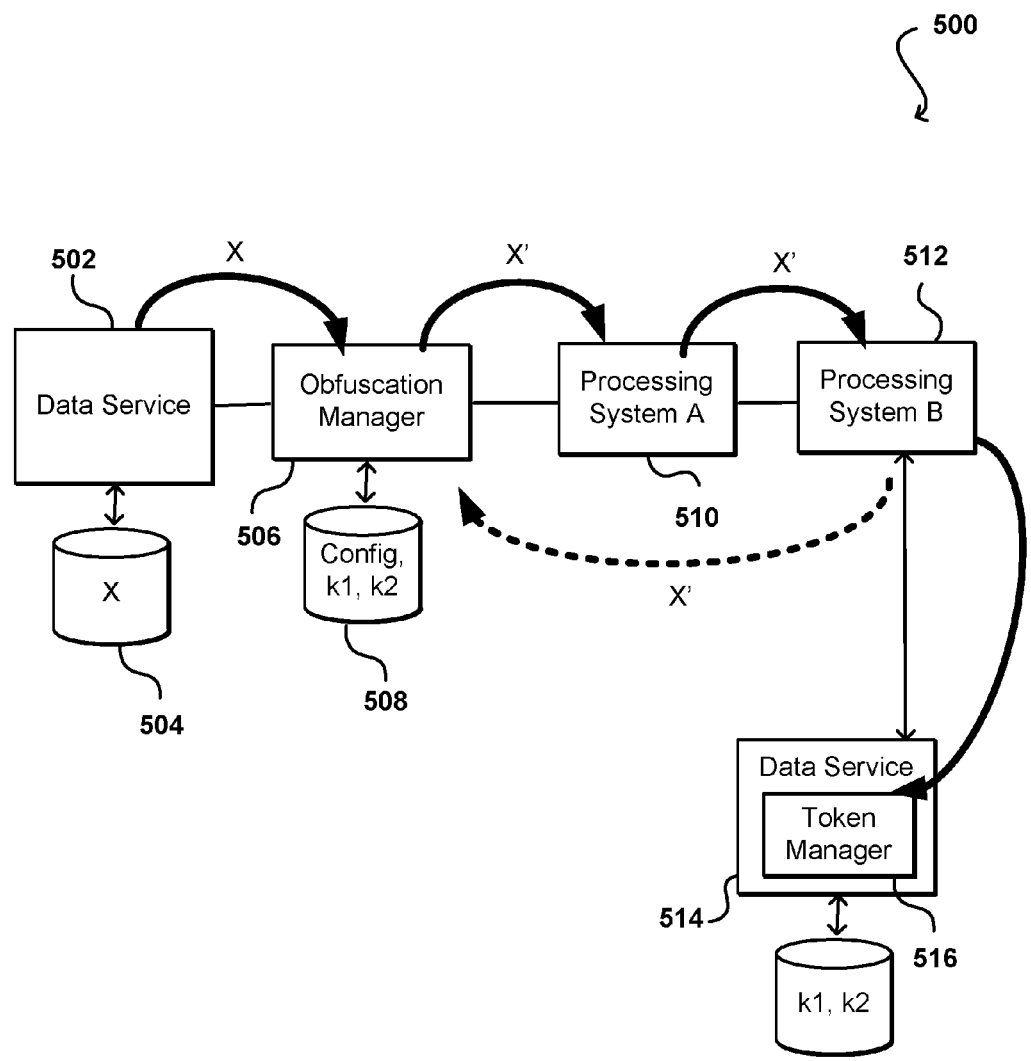
FIG. 5 illustrates an example environment in which an obfuscation manager can enable access to data but ensure that specific fields are obfuscated that can be utilized in accordance with various embodiments.

In some embodiments an entity may not want to be responsible for managing keys or performing encryption for sensitive data. Further, the entity may want to be able to access the data using existing software, libraries, and other such components. Accordingly, approaches in accordance with various embodiments can provide an obfuscation service, such as an obfuscation manager 506 illustrated in the example configuration 500 of FIG. 5, that acts as a layer sitting on top of the conventional data service 502. In this example, the obfuscation manager 506 might be provided as a third party service that is separate from the data service 502, or might be provided as an option of the data service, among other such options. A processing system 510 could then interact with the obfuscation manager 506 just as if interacting with the data service 502, such instead could receive obfuscated data instead of the underlying sensitive plaintext or other such data. A customer might be able to provide at least one access policy, for example, that indicates the entities that should have access to the plaintext and/or the entities (or types of entities) that can only access obfuscated data, at least for specified fields, types of data, etc.

In this example, one or more processing systems 510, 512 might request data, here X, to be processed as part of a processing pipeline. The first processing system 510 could send a request to the obfuscation manager 506, but would send the same request that would otherwise have been sent to the underlying data service 502. The obfuscation manager can send a request to the data service for data X, which is stored in a data repository 504 for the data service. The obfuscation manager can then receive the data X from the data service 502, and perform an obfuscation of at least the sensitive portion of the data (i.e., personal or confidential information) using the process discussed previously. This can include, for example, generating a token including an SIV generated using first key k1 and a ciphertext portion generated using the SIV, the second key k2, and the sensitive data. The keys, sensitive data, token generation protocol, and other such information can be obtained from configuration or other data stored with the keys or other such information in a repository or data store 508 for the obfuscation service. In at least some embodiments the obfuscation manager can also be aware of the content type or structure. If the underlying data X is in XML, the fields can be tokenized such that the obfuscated data appears as a chunk or blob of XML data. The obfuscation manager can also, per the configuration information, obfuscate the data, the keys, or both. As with the previous example, the tokenized data X' can be passed among the processing systems 510, 512 until that data is received to the original data service 502 or a separate data service 514, or similar system or service, that includes a token manager 516 or has an obfuscation manager layer 506 with access to at least the second key k2 in order to extract or recover the plaintext.

Such an approach allows for aggregation by, for example, obfuscating the personal information for an action that was performed in the system, but enabling access to information such as the time and location where the action was performed. This information can be aggregated with similar information for other users, such that the total number of actions over a given period of time can be determined without having access to information for any of the customers for whom those actions were performed.

Figure 6:
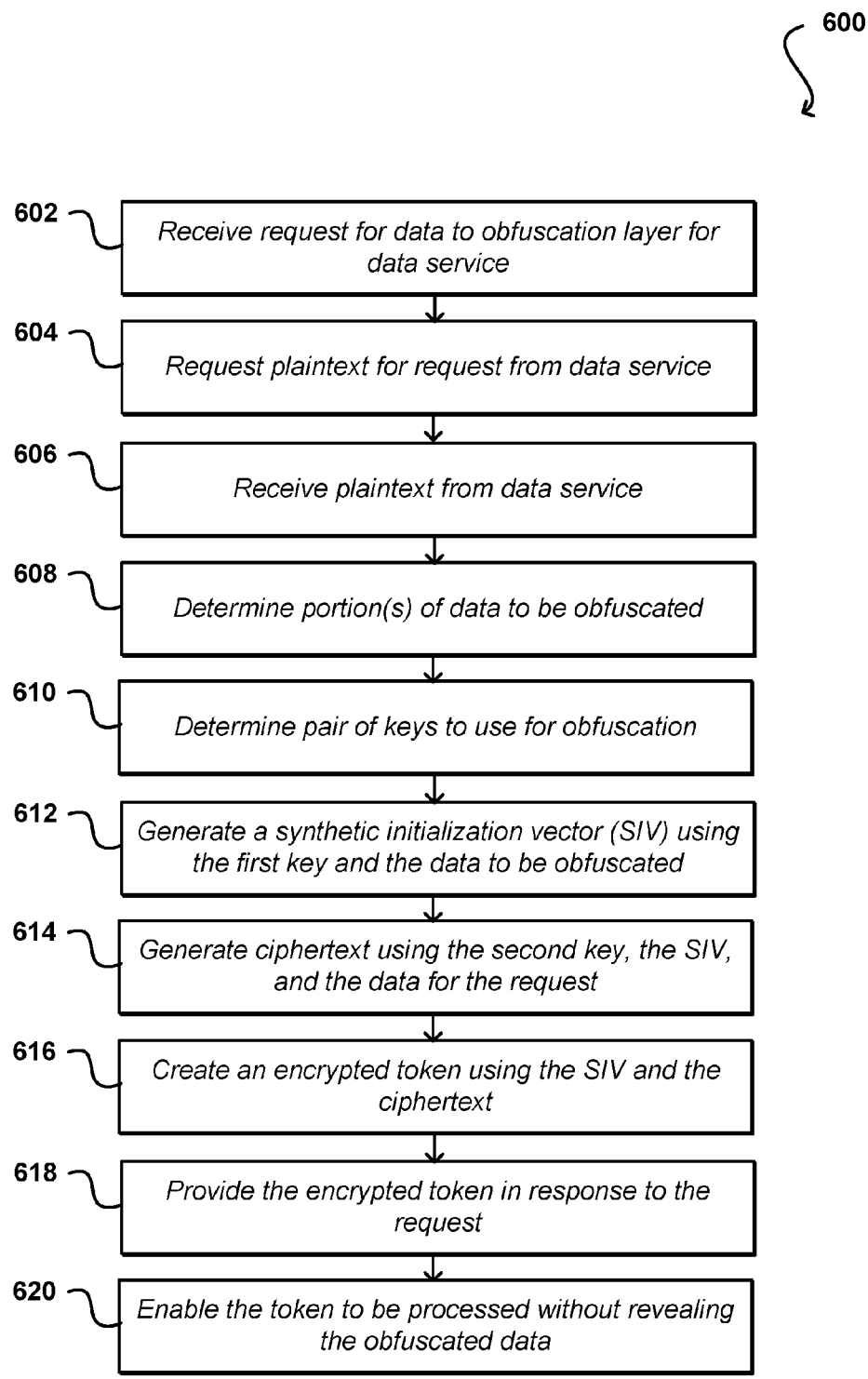
FIG. 6 illustrates an example process for generating a token that obfuscates specific data fields that can be utilized in accordance with various embodiments.

FIG. 6 illustrates an example process 600 for using an obfuscation overlay to obfuscate sensitive data that can be used in accordance with various embodiments. In this example, a request for data is received 602 to an obfuscation overlay service that sits between the requesting entity and the underlying data service. The obfuscation overlay service can request 604 the plaintext from the underlying data service, and receive 606 the data back from the data service. The data can be analyzed to determine 608 one or more portions, subsets, or fields of data that are sensitive, such as per the applicable access policy, and thus should be obfuscated before being provided in response to the request. In order to perform the obfuscation of the sensitive data, a pair of keys can be determined 610. A synthetic initialization vector can be generated 612 using the keys and the sensitive data. This initialization vector can be used with the second key to generate 614 ciphertext based on the sensitive data. The initialization vector and ciphertext then can be combined to create 616 a data token that can be provided 618 instead of the sensitive plaintext data. A processing system or other recipient of the token can then be enabled 620 to process (i.e., aggregate, sort, or transform) the token in lieu of the sensitive plaintext data. As mentioned, in at least some embodiments the data for the request that was not determined to be sensitive could have been provided as plaintext, among other such options.

Figure 7:
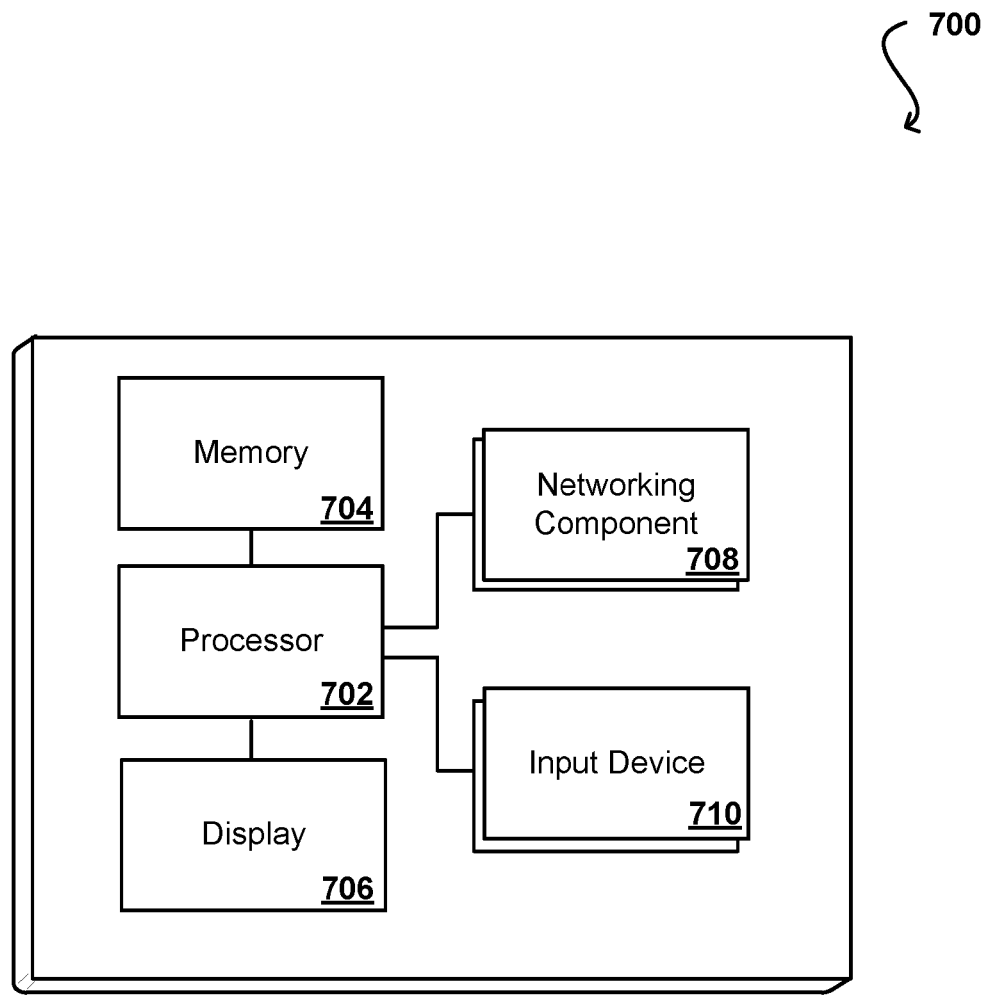
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, from a processing system of a multi-tenant environment, a request for customer data stored by a data storage system of the multi-tenant environment, the customer data associated with a customer having an account with a provider of the multi-tenant environment;
   determining, per an access policy specified by the customer, that a portion of the customer data for the request is sensitive data that is restricted from full access by the processing system;
   determining a first key and a separate second key corresponding to the sensitive data;
   generating a token for the sensitive data, the token generated using the first key and ciphertext of the sensitive data generated using the second key, an initialization vector, and padding;
   providing the token for the sensitive data, along with other non-sensitive customer data for the request, to the processing system; and
   causing the processing system to aggregate the sensitive data, and other non-sensitive customer data, with additional data for additional customers, wherein aggregated data analysis is enabled to be performed by the processing system without the processing system having access to an unencrypted form of the sensitive data for the customer.

2. The computer-implemented method of claim 1, further comprising:
   receiving the token for the sensitive data by a receiving system having access to the second key; and
   decrypting the sensitive data from the ciphertext using the second key.

3. The computer-implemented method of claim 2, further comprising:
   verifying, at the receiving system, that an initialization vector generated by the receiving system, using the first key and the decrypted sensitive data, matches the initialization vector in the received token.

4. The computer-implemented method of claim 1, further comprising:
   storing an association between the sensitive data, the first key, and the second key, wherein a same token can be generated for a subsequent request using the sensitive data, the first key, and the second key.

5. The computer-implemented method of claim 1, further comprising:
   receiving the request by an obfuscation service, the obfuscation service functioning as the data storage system from a viewpoint of the processing system;
   obtaining the sensitive data from the data storage system;
   generating the token by the obfuscation service; and
   providing the token to the processing service from the obfuscation service.

6. A computer-implemented method, comprising:
   receiving a request for data from a requesting system;
   determining that a portion of the data for the request is sensitive data having restricted access for the requesting system;
   determining a first key and a separate second key corresponding to the sensitive data;
   generating a token for the sensitive data, the token generated using the first key and ciphertext of the sensitive data generated using the second key, an initialization vector, and padding; and
   providing the token for the sensitive data, along with other non-sensitive data for the request, to the requesting system, wherein the requesting system is able to process the sensitive data and other non-sensitive data without the requesting system having access to an unencrypted version of the sensitive data.

7. The computer-implemented method of claim 6, further comprising:
   enabling the requesting system to process the sensitive data and other non-sensitive data by at least one of aggregating, sorting, grouping, or transforming the sensitive data and other non-sensitive data.

8. The computer-implemented method of claim 6, wherein the data for the request is stored by a data storage service, and further comprising:
   receiving the request for data by an obfuscation system;
   obtaining the data for the request from the data storage service;
   generating the token via the obfuscation system; and
   providing the token to the requesting system from the obfuscation system, wherein the requesting system is enabled to interact with the obfuscation system as the requesting system would otherwise interact with the data storage service.

9. The computer-implemented method of claim 6, wherein the data storage service is operated by a separate provider than a resource provider for the obfuscation system.

10. The computer-implemented method of claim 6, wherein the data for the request is associated with a customer, and further comprising:
    determining an access control policy corresponding to the data for the request; and
    determining the sensitive data based at least in part upon the access control policy.

11. The computer-implemented method of claim 6, wherein the first key and the second key are symmetric cryptographic keys or asymmetric cryptographic keys.

12. The computer-implemented method of claim 6, wherein the first key and the second key are portions of a single master key or generated using a key derivation scheme.

13. The computer-implemented method of claim 6, further comprising:
determining a structure of the sensitive data; and
maintaining the structure in providing the token for the sensitive data.

14. The computer-implemented method of claim 6, further comprising:
storing an association between the sensitive data, the first key, and the second key, wherein a same token can be generated for a subsequent request using the sensitive data, the first key, and the second key.

15. The computer-implemented method of claim 6, further comprising:
generating the initialization vector by computing a hash-based message authentication code (HMAC) using the first key and an algorithm selected from a family of SHA algorithms.

16. The computer-implemented method of claim 6, further comprising:
receiving the token for the sensitive data; and
decrypting the sensitive data from the ciphertext using the second key;
verifying that an initialization vector generated using the first key and the decrypted sensitive data matches the initialization vector in the received token.

17. A system, comprising:
at least one processor; and
memory including instructions that, when executed by the at least one processor, cause the system to:
receive a request for data from a requesting system;
determine that a portion of the data for the request is sensitive data having restricted access for the requesting system;
determine a first key and a separate second key corresponding to the sensitive data;
generate a token for the sensitive data, the token generated using the first key and ciphertext of the sensitive data generated using the second key, an initialization vector, and padding; and
provide the token for the sensitive data, along with other non-sensitive data for the request, to the requesting system, wherein the requesting system is able to receive the sensitive data and other non-sensitive data without the requesting system having access to plaintext for the sensitive data.

18. The system of claim 17, wherein the instructions when executed further cause the system to:
enable the requesting system to process the sensitive data and other non-sensitive data by at least one of aggregating, sorting, grouping, or transforming the sensitive data and other non-sensitive data.

19. The system of claim 17, wherein the data for the request is stored by a data storage service, and wherein the instructions when executed further cause the system to:
receive the request for data to an obfuscation system;
obtain the data for the request from the data storage service;
generate the token via the obfuscation system; and
provide the token to the requesting system from the obfuscation system, wherein the requesting system is enabled to interact with the obfuscation system as the requesting system would otherwise interact with the data storage service.

20. The system of claim 17, wherein the instructions when executed further cause the system to:
receive the token for the sensitive data by a receiving system having access to the second key; and
decrypt the sensitive data from the ciphertext using the second key.

\* \* \* \* \*